United States Patent
Yuan et al.

(10) Patent No.: US 11,492,906 B2
(45) Date of Patent: Nov. 8, 2022

(54) SPRAYER FOR SETTLING DUST OF COAL MINE

(71) Applicants: Anhui University of Science and Technology, Anhui (CN); PINGAN COAL MINING ENGINEERING RESEARCH INSTITUTE CO., LTD, Anhui (CN)

(72) Inventors: Liang Yuan, Anhui (CN); Bingyou Jiang, Anhui (CN); Qinghua Chen, Anhui (CN); Mingyun Tang, Anhui (CN); Jinwei Qiu, Anhui (CN); Bo Ren, Anhui (CN); Mingqing Su, Anhui (CN)

(73) Assignees: ANHUI UNIVERSITY OF SCIENCE AND TECHNOLOGY, Anhui (CN); PINGAN COAL MINING ENGINEERING RESEARCH INSTITUTE CO., LTD., Anhui (CN)

( * ) Notice: Subject to any disclaimer, the term of this patent is extended or adjusted under 35 U.S.C. 154(b) by 0 days.

(21) Appl. No.: 17/619,538

(22) PCT Filed: Jul. 14, 2020

(86) PCT No.: PCT/CN2020/101801
§ 371 (c)(1),
(2) Date: Dec. 15, 2021

(87) PCT Pub. No.: WO2021/227239
PCT Pub. Date: Nov. 18, 2021

(65) Prior Publication Data
US 2022/0205360 A1    Jun. 30, 2022

(30) Foreign Application Priority Data

May 25, 2020 (CN) .......................... 202010451085.0

(51) Int. Cl.
*E21F 5/04* (2006.01)
*B01D 47/06* (2006.01)
(Continued)

(52) U.S. Cl.
CPC .............. *E21F 5/04* (2013.01); *B01D 47/063* (2013.01); *E21F 5/02* (2013.01); *E21F 5/20* (2013.01)

(58) Field of Classification Search
CPC ...... E21F 5/04; E21F 5/02; E21F 5/20; B01D 47/063
See application file for complete search history.

(56) References Cited

FOREIGN PATENT DOCUMENTS

| CN | 104265289 A | * | 1/2015 | .......... E21C 35/223 |
| CN | 104941844 A | | 9/2015 | |

(Continued)

*Primary Examiner* — Janine M Kreck
(74) *Attorney, Agent, or Firm* — Muncy, Geissler, Olds & Lowe, D.C.

(57) ABSTRACT

A sprayer for settling dust of a coal mine includes: an outer housing, having at least one opening configured to spray water mist; a sprayer, placed in the outer housing, configured to spray water mist through the opening; a plurality of water curtain nozzles, configured to spray water curtain lines outside the opening to block suspended dust; and a support, configured to support the outer housing. The water curtain nozzles are in an equidistant arrangement around a center of the opening. A plurality of the water curtain nozzles are constructed such that the nozzles are all oriented toward the same point, to form a circular or conical water curtain.

6 Claims, 4 Drawing Sheets

(51) Int. Cl.
*E21F 5/20* (2006.01)
*E21F 5/02* (2006.01)

(56) References Cited

FOREIGN PATENT DOCUMENTS

| | | |
|---|---|---|
| CN | 206853946 U | 1/2018 |
| CN | 207187387 U | 4/2018 |
| CN | 109931299 A | 6/2019 |
| CN | 210230344 U | 4/2020 |
| KR | 101879592 B1 | 7/2018 |
| KR | 102040031 B1 | 11/2019 |
| WO | WO-2017221017 A1 | 12/2017 |

* cited by examiner

SPRAYER FOR SETTLING DUST OF COAL MINE

TECHNICAL FIELD

The present invention relates to the field of dust settlers, and in particular, to a sprayer for settling dust of a coal mine.

BACKGROUND

During mining, a lot of dust is generated. Coal miners inhaling floating dust in a mine for a long time are prone to a lung lesion. Coal dust suspended in the air may result in an explosion under a specific concentration or influence of a shock wave, imposing a serious potential safety hazard. Thus, a sprayer for settling dust of a coal mine is usually used during mining. Dust in the air is adsorbed and settled by means of spraying in the air.

Various sprayers for settling dust of a coal mine exist on the market. However, most existing sprayers settle dust merely by means of spraying. In this case, part of the dust fails to be combined with water mist and is blown to the air again, resulting in insufficient dust settlement.

SUMMARY

For the deficiency of the prior art, the present invention provides a sprayer for settling dust of a coal mine, thereby resolving the technical problem such as insufficient dust settlement of an existing sprayer for settling dust of a coal mine.

The objective of the present invention can be achieved by the following technical solution:

A sprayer for settling dust of a coal mine, the sprayer including:

an outer housing, having at least one opening configured to spray water mist;

a sprayer, placed in the outer housing and configured to spray water mist outward through the opening;

a plurality of water curtain nozzles, configured to spray water curtain lines outside the opening to block suspended dust; and a support, configured to support the outer housing.

Further, the water curtain nozzles are in an equidistant arrangement around a center of the opening. A plurality of the water curtain nozzles are constructed such that the nozzles are all oriented toward the same point, to form a circular or conical water curtain.

Further, the sprayer includes a bearing plate and a water storage apparatus, where a drainage channel is provided under the bearing plate, and the bearing plate is brought into communication with the water storage apparatus through the drainage channel.

Further, a rotary ring is disposed outside the opening, the rotary ring is rotatably connected to the outer housing, the water curtain nozzles are fixedly mounted to the rotary ring, and a driving mechanism is capable of driving the rotary ring to rotate about a center of the opening.

Further, a filter is disposed in the drainage channel.

Further, the driving mechanism is a motor, an output end of the motor is connected to a belt pulley, and the belt pulley is interlinked to the rotary ring by using a belt.

Further, a plurality of horizontal transverse slots are formed on the outer housing. An adjustment ring is disposed in the outer housing. The adjustment ring is coaxial with the outer housing and is arranged along an inner wall of the outer housing. A pull rod is slidably connected to each of the transverse slots. One end of the pull rod extends into the outer housing through the transverse slot and is fixedly connected to the adjustment ring. An other end of the pull rod extends out of the outer housing.

Two collinear sliding rails are disposed in the outer housing. A gap exists between the two sliding rails. A baffle is slidably connected to each of the sliding rails. A link is hinged to the baffle. One end of the link is hinged to one end of the pull rod that is located inside the outer housing.

Further, a plurality of horizontal transverse slots are formed on the outer housing. An adjustment ring is disposed in the outer housing. The adjustment ring is coaxial with the outer housing and is arranged along an inner wall of the outer housing. A pull rod is slidably connected to each of the transverse slots. One end of the pull rod extends into the outer housing through the transverse slot and is fixedly connected to the adjustment ring. An other end of the pull rod extends out of the outer housing.

Four guide plates that are symmetrically distributed are disposed inside the adjustment ring. One end of each of the guide plates is hinged to the outer housing. A gap is formed between two of the guide plates. The gap is aligned to a spraying opening. A spring is disposed between each of the guide plates and the outer housing. The guide plate abuts against an inner wall of the adjustment ring.

The present invention has the following beneficial effects:

The dust settler of the present invention combines spraying and a water curtain, which first adsorbs dust in the air by using water mist to promote settlement of the dust, and then captures and washes the dust escaping from the water mist by using the water curtain, to realize more sufficient dust settlement.

BRIEF DESCRIPTION OF THE DRAWINGS

The following further describes the present invention in detail with reference to the accompanying drawings.

Figure 1:
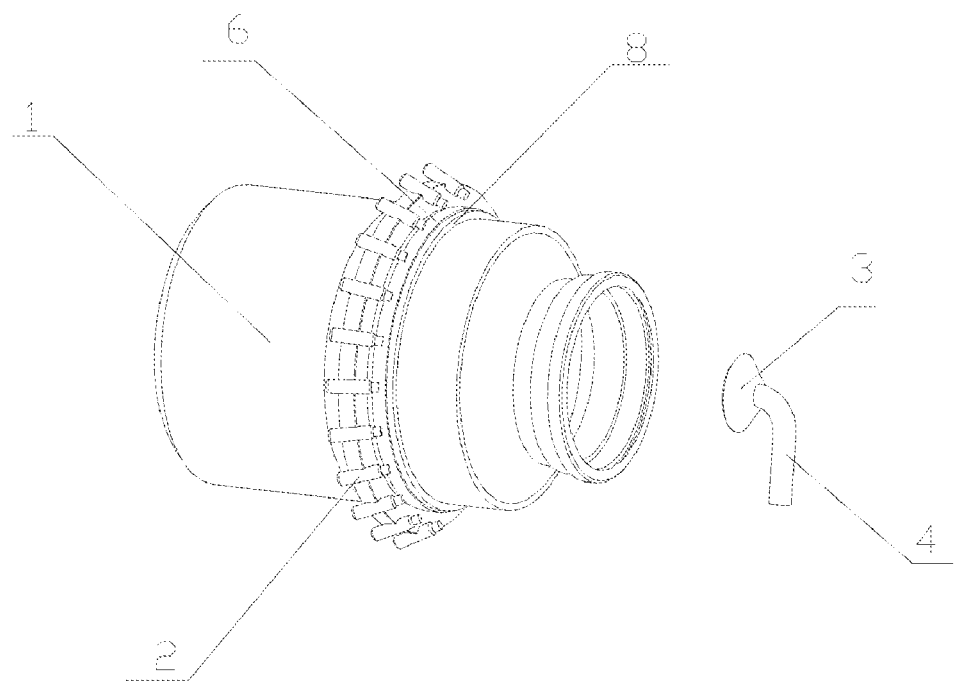
FIG. 1 is a three-dimensional schematic structural diagram of this application.

Components corresponding to reference numerals in the figures are as follows:

1. Outer housing; 2. Water curtain nozzle; 3. Bearing plate; 4. Drainage channel; 5. Motor; 6. Belt pulley; 7. Belt; 8. Rotary ring; 9. Pull rod; 10. Transverse slot; 11. Adjustment ring; 12. Link; 13. Sliding rail; 14. Guide plate; 15. Spring; 16. Baffle; 17. Spayer; 18. Support; and 19. Opening.

DETAILED DESCRIPTION

The following clearly and completely describes the technical solutions in the embodiments of the present invention with reference to the accompanying drawings in the embodiments of the present invention. Apparently, the described embodiments are some of the embodiments of the present invention rather than all of the embodiments. Based on the embodiments of the invention, all other embodiments obtained by those of ordinary skill in the art without going through any creative work shall fall within the scope of protection of the invention.

In the description of the present invention, it should be understood that orientation or position relationships indicated by the terms such as "hole", "above", "below", "thickness", "top", "middle", "length", "inside", and "around" are used only for ease and brevity of illustration and description, rather than indicating or implying that the mentioned component or element need to have a particular orientation or need to be constructed and operated in a particular orientation. Therefore, such terms should not be construed as limiting of the present invention.

Figure 2:
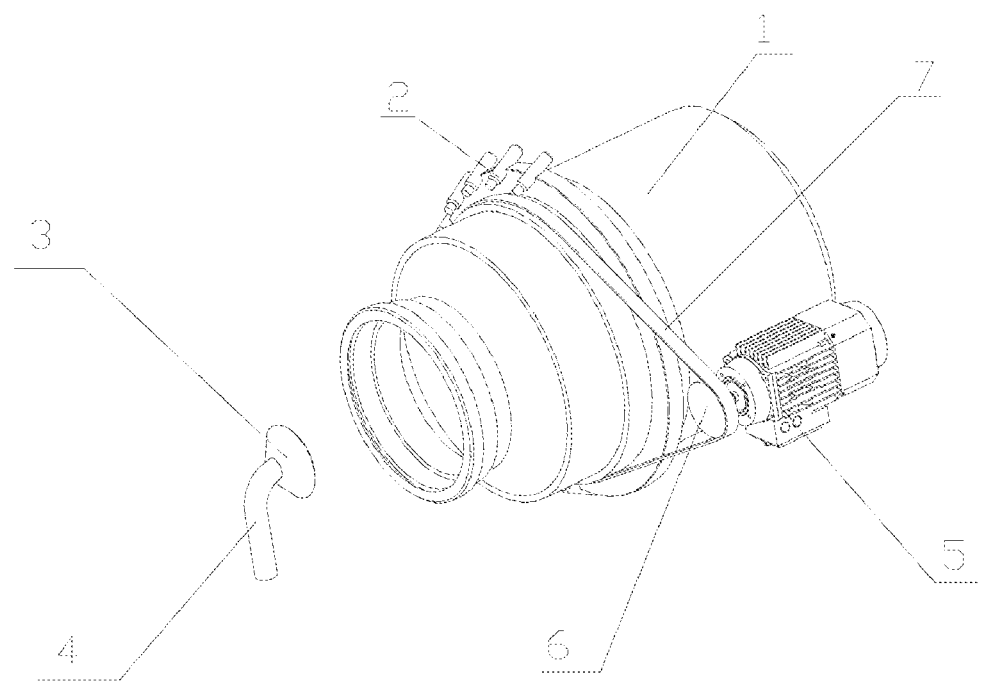
FIG. 2 is a three-dimensional schematic structural diagram from another perspective of this application.

Referring to FIG. 1 and FIG. 2, a sprayer 17 for settling dust of a coal mine includes:

an outer housing 1, having at least one opening 19 configured to spray water mist;

a sprayer 17, placed in the outer housing 1 and configured to spray water mist outward through the opening 19;

a plurality of water curtain nozzles 2, configured to spray water curtain lines outside the opening 19 to block suspended dust; and a support 18, configured to support the outer housing 1.

In a specific embodiment of the present invention, the water curtain nozzles 2 are in an equidistant arrangement around a center of the opening 19. A plurality of the water curtain nozzles 2 are constructed such that the nozzles are all oriented toward the same point, to form a circular or conical water curtain.

During actual working, the dust settler of the present invention is placed in a mine. Air in the mine is sucked into the outer housing 1, the sprayer 17 sprays water mist to the air sucked into the outer housing 1, and then the air is exhausted out of the outer housing 1 through the opening 19. During the sucking and the exhaustion, dust in the air is preliminarily mixed with the water mist. However, dust freely suspended in the air may still exist during the exhaustion. In order to prevent the dust from escaping and entering the air again, the water curtain nozzles 2 outside the opening 19 form a circular or conical water curtain. In this way, the dust still suspended in the air can be further blocked. It may be understood that, by means of the combination of the spraying and the water curtain, a dust settling effect is further enhanced, so that the dust suspended in the air can be completely removed. In particular, in the conical water curtain, the water mist has a space for further spreading after being discharged from the opening 19. In this way, the mixing is more sufficient.

Further, as the water curtain nozzles 2 and the sprayer 17 discharge water continuously, for saving water resources and avoiding water accumulation in the mine, the dust settler in the embodiments further includes a bearing plate 3 and a water storage apparatus. A drainage channel 4 is disposed under the bearing plate 3. The bearing plate 3 is brought into communication with the water storage apparatus through the drainage channel 4. In other words, when the water curtain nozzles 2 discharge water, the bearing plate 3 stops the water curtain from extending outward on a tail end of the water curtain, and receives the discharged water. The water stopped by the bearing plate 3 flows into the water storage apparatus through the drainage channel 4. The water in the water storage apparatus may be reused after treatment. In this way, not only the water used in the mine can be reduced, but also water accumulation in the mine as a result of water spraying for dust settlement can be avoided.

Further, a rotary ring 8 is disposed outside the opening 19, the rotary ring 8 is rotatably connected to the outer housing 1. The water curtain nozzles 2 are fixedly mounted to the rotary ring 8, and a driving mechanism is capable of driving the rotary ring 8 to rotate about a center of the opening 19.

More specifically, the driving mechanism is a motor 5, an output end of the motor 5 is connected to a belt pulley 6, and the belt pulley 6 is interlinked to the rotary ring 8 by using a belt 7. By means of the configuration, the motor 5 drives the rotary ring 8 to rotate, so that the water curtain nozzles 2 rotate with the rotary ring 8 while spraying water, thereby forming a rotary water curtain. In this way, a dust escaping probability is reduced.

Similarly, in the embodiments, in order to avoid water accumulation in the mine and a waste of water resources, the bearing plate 3 and the water storage apparatus are further disposed. The water curtain nozzles 2 spray water from top to bottom, the bearing plate 3 is disposed under the water curtain nozzles 2, the drainage channel 4 is disposed on the bearing plate 3, and the bearing plate 3 is brought into communication with the water storage apparatus through the drainage channel 4. In this way, the water sprayed by the water curtain nozzles 2 directly falls into the bearing plate 3 and then flows into the water storage apparatus through the drainage channel 4.

Further, a filter is disposed in the drainage channel 4. The dust adsorbed in the water is filtered by using the filter, and then the water flows into the water storage apparatus. In this way, the water flowing into the water storage apparatus may be directly reused. The water may be brought into the sprayer 17, thereby forming water circulation.

Figure 3:
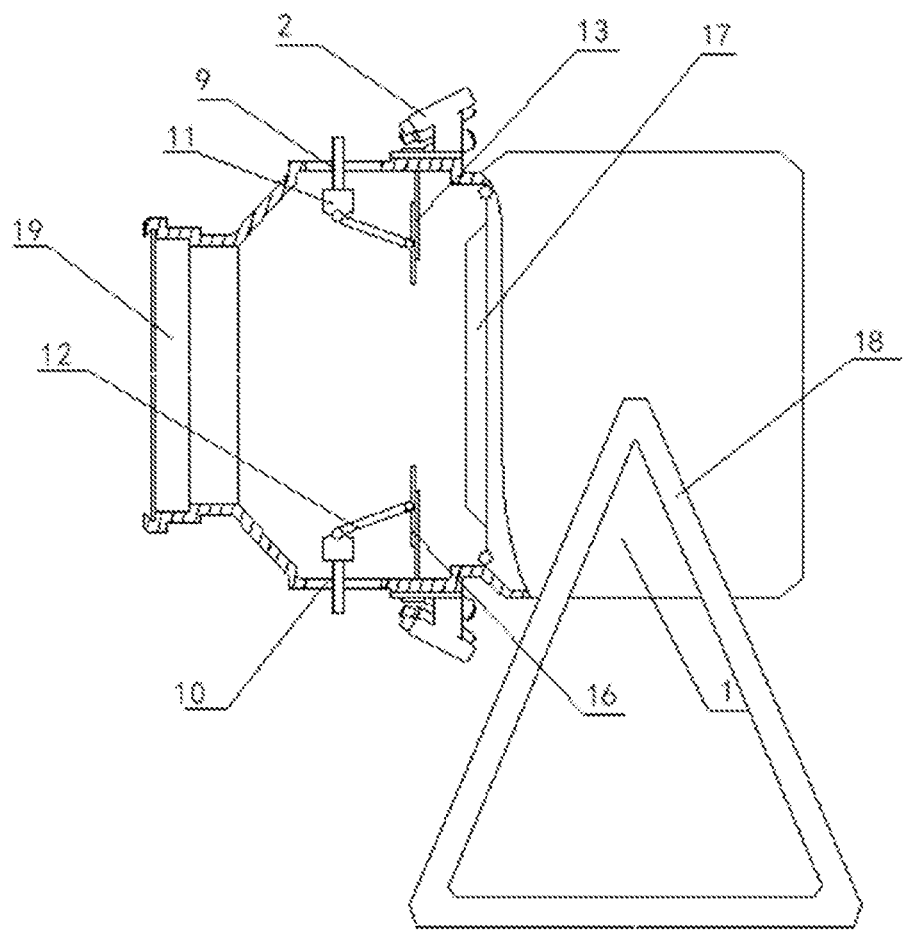
FIG. 3 is a schematic structural diagram of part of a cross section according to an embodiment of this application.

Further, referring to FIG. 3, a plurality of horizontal transverse slots 10 are formed on the outer housing 1. An adjustment ring 11 is disposed in the outer housing 1. The adjustment ring 11 is coaxial with the outer housing 1 and is arranged along an inner wall of the outer housing 1. A pull rod 9 is slidably connected to each of the transverse slots 10. One end of the pull rod 9 extends into the outer housing 1 through the transverse slot 10 and is fixedly connected to the adjustment ring 11. An other end of the pull rod 9 extends out of the outer housing 1.

Two collinear sliding rails 13 are disposed in the outer housing 1. A gap exists between the two sliding rails 13. A baffle 16 is slidably connected to each of the sliding rails 13. A link 12 is hinged to the baffle 16. One end of the link 12 is hinged to one end of the pull rod 9 that is located inside the outer housing 1.

More specifically, before spraying for dust settlement, the pull rod 9 may be moved to drive the adjustment ring 11 to translate along the transverse slot 10. The adjustment ring 11 drives the links 12 to rotate, so as to drive the baffle 16 to move downward, thereby reducing a cross-sectional area of a spraying outlet of a spraying nozzle, which is applicable to different working conditions.

Figure 4:
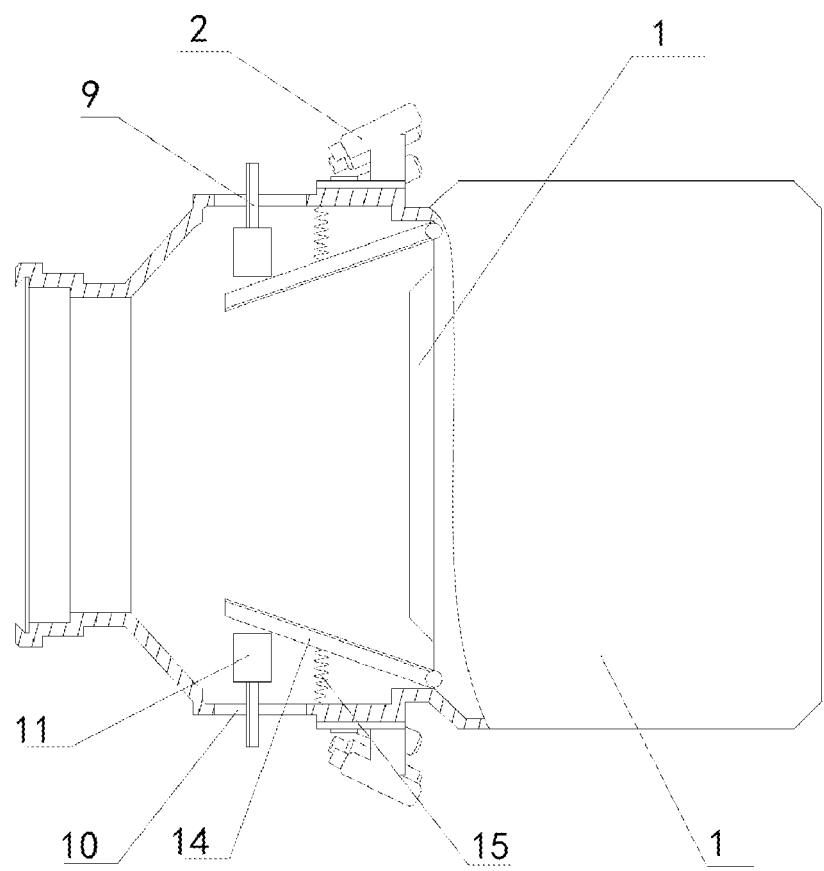
FIG. 4 is a schematic structural diagram of part of a cross section according to another embodiment of this application.

In another embodiment of the present invention, referring to FIG. 4, a plurality of horizontal transverse slots 10 are formed on the outer housing 1. An adjustment ring 11 is disposed in the outer housing 1. The adjustment ring 11 is coaxial with the outer housing 1 and is arranged along an inner wall of the outer housing 1. A pull rod 9 is slidably connected to each of the transverse slots 10. One end of the pull rod 9 extends into the outer housing 1 through the transverse slot 10 and is fixedly connected to the adjustment ring 11. An other end of the pull rod 9 extends out of the outer housing 1.

Four guide plates 14 that are symmetrically distributed are disposed inside the adjustment ring 11. One end of each of the guide plates 14 is hinged to the outer housing 1. A gap is formed between two of the guide plates 14. The gap is aligned to a spraying opening. A spring 15 is disposed between each of the guide plates 14 and the outer housing 1. The guide plate 14 abuts against an inner wall of the adjustment ring 11.

More specifically, before spraying for dust settlement, an operator may move the pull rod 9 to drive the adjustment ring 11 to translate, so as to extrude the guide plates 14, so that the gaps among the guide plates 14 are reduced, thereby adjusting the cross-sectional area of the spraying outlet of the spraying nozzle, which is applicable to different working conditions.

In the descriptions of this specification, a description of a reference term such as "an embodiment", "an example", or "a specific example" means that a specific feature, structure, material, or characteristic that is described with reference to the embodiment or the example is included in at least one embodiment or example of the present invention. In this specification, exemplary descriptions of the foregoing terms do not necessarily refer to the same embodiment or example. In addition, the described specific features, structures, materials, or characteristics may be combined in a proper manner in any one or more of the embodiments or examples.

The foregoing displays and describes basic principles, main features of the present invention and advantages of the present invention. A person skilled in the art may understand that the present invention is not limited to the foregoing embodiments. Descriptions in the embodiments and this specification only illustrate the principles of the present invention. Various modifications and improvements are made in the present invention without departing from the spirit and the scope of the present invention, and these modifications and improvements shall fall within the protection scope of the present invention.

What is claimed is:

1. A sprayer for settling dust of a coal mine, comprising:

an outer housing, provided with at least one opening configured to spray water mist; a sprayer, placed in the outer housing and configured to spray water mist outward through the opening;

a plurality of water curtain nozzles, configured to spray water curtain lines outside the opening to block suspended dust; and a support, configured to support the outer housing;

wherein a plurality of horizontal transverse slots are formed on the outer housing, an adjustment ring is disposed in the outer housing, the adjustment ring is coaxial with the outer housing and is arranged along an inner wall of the outer housing, a pull rod is slidably connected to each of the transverse slots, one end of the pull rod extends into the outer housing through the transverse slot and is fixedly connected to the adjustment ring, and an other end of the pull rod extends out of the outer housing; and two collinear sliding rails are disposed in the outer housing, a gap exists between the two sliding rails, a baffle is slidably connected to each of the sliding rails, a link is hinged to the baffle, and one end of the link is hinged to one end of the pull rod that is located inside the outer housing.

2. The sprayer for settling dust of a coal mine according to claim 1, wherein the water curtain nozzles are in an equidistant arrangement around a center of the opening, and a plurality of the water curtain nozzles are constructed such that the nozzles are all oriented toward the same point, to form a circular or conical water curtain.

3. The sprayer for settling dust of a coal mine according to claim 2, comprising a bearing plate and a water storage apparatus, wherein a drainage channel is provided under the bearing plate, and the bearing plate is brought into communication with the water storage apparatus through the drainage channel.

4. The sprayer for settling dust of a coal mine according to claim 3, wherein a filter is disposed in the drainage channel, and water in the water storage apparatus is conveyed to the sprayer.

5. The sprayer for settling dust of a coal mine according to claim 1, wherein a rotary ring is disposed outside the opening, the rotary ring is rotatably connected to the outer housing, the water curtain nozzles are fixedly mounted to the rotary ring, and a driving mechanism is capable of driving the rotary ring to rotate about a center of the opening.

6. The sprayer for settling dust of a coal mine according to claim 5, wherein the driving mechanism is a motor, an output end of the motor is connected to a belt pulley, and the belt pulley is interlinked to the rotary ring by using a belt.

* * * * *